Figure 1:
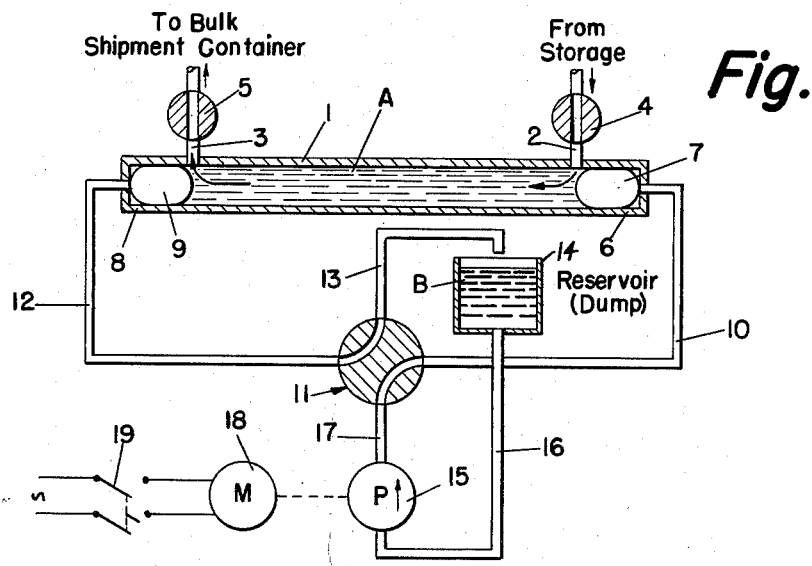

Sept. 26, 1961  P. D. BARTON ET AL  3,001,543
SYSTEM FOR TRANSFERRING PREDETERMINED QUANTITIES OF FLUIDS
Filed Aug. 25, 1958  3 Sheets-Sheet 1

INVENTORS
PAUL D. BARTON
EINAR T. YOUNG
BY Robert O. Spundle
ATTORNEY

Sept. 26, 1961 P. D. BARTON ET AL 3,001,543
SYSTEM FOR TRANSFERRING PREDETERMINED QUANTITIES OF FLUIDS
Filed Aug. 25, 1958 3 Sheets-Sheet 2

INVENTORS
PAUL D. BARTON
EINAR T. YOUNG
BY
ATTORNEY

INVENTORS
PAUL D. BARTON
EINAR T. YOUNG
BY
Robert O. Spindle
ATTORNEY

United States Patent Office

3,001,543
Patented Sept. 26, 1961

3,001,543
SYSTEM FOR TRANSFERRING PREDETERMINED QUANTITIES OF FLUIDS
Paul D. Barton, Phoenixville, and Einar T. Young, Newtown Square, Pa., assignors to Sun Oil Company, Philadelphia, Pa., a corporation of New Jersey
Filed Aug. 25, 1958, Ser. No. 756,916
6 Claims. (Cl. 137—242)

This invention relates to a system for positively transferring predetermined (measured) quantities of valuable products such as lubricating oils, in such a way as to avoid loss and contamination. Considered from another aspect, the system may be considered as a scavenging system, since the pipe by means of which the fluids are transferred is scavenged in order to complete the transfer of the measured quantity of fluid or product.

Because of the large number and variety of products in plants manufacturing lubricants on a commercial scale, it has been considered impractical or uneconomical to provide special lines or pipes allocated to the use of individual products. Therefore, it is common practice to use the same line or length of pipe for successive deliveries of different, incompatible products. The use of a single, common line for batch transfer of a number of different products has, in the past, resulted in:

(1) Contamination of products by intermixing in the common line, when a change is made from one product to another;

(2) Wastage of valuable products by diverting common-line washes to "slop oil," or other depreciation in the value of the products;

(3) Loss of use time of the common line through a time-consuming process of manipulation of valves, and of intermediate cleaning of lines; and (4) Inefficiency in plant operation due to the necessary preparation of an excess quantity of the product, to allow for losses and diversions.

An object of this invention is to provide a novel arrangement for scavenging a length of pipe, whereby this length of pipe may be used for successive deliveries of incompatible products without serious loss or contamination, and whereby a positive transfer of measured quantities of valuable products for shipment in tank cars, tank trucks, or other bulk containers may be effected.

Another object is to provide a novel system for transferring predetermined or measured quantities of fluid products, which system can be operated or manipulated remotely, e.g. from a central point.

A further object is to provide a novel system for transferring predetermined quantities of fluid products which functions in such a manner that, at the end of the transferring operation, the common line is maintained in a relatively clean condition, ready for the transfer of a different product without further cleaning.

The objects of this invention are accomplished, briefly, in the following manner:

A main length of pipe of a constant diameter, operating as a transfer line, is provided with a valved side connection near each of its ends, but spaced therefrom to provide a respective end socket at each end of the main pipe. A free imperforate piston is normally disposed in each of these sockets, each of these pistons being in such a position as not to interfere with fluid flow through its nearby side connection. The sockets are provided with separate hydraulic connections to their closed or outer ends, and means are provided for coupling these connections selectively to a hydraulic fluid pump or to a hydraulic fluid dump (reservoir), for the purpose of moving the free pistons (sometimes termed "pigs" in the art) either singly or in pairs, at the will of the operator. Only one of the free pistons is moved by the product being transferred. By suitable manipulation of the valves in the side connections and of the hydraulic connections, one of the pistons is caused to move in the downstream direction through the main pipe, thereby to scavenge such pipe, and is then pushed back in the upstream direction, to its original position, by the other piston.

A detailed description of the invention follows, taken in conjunction with the accompanying drawings, wherein:

FIG. 1 is a diagrammatic representation of the complete system of the invention, illustrating the various parts in their normal or original positions; and FIGS. 2–10 are diagrammatic views similar to FIG. 1, but illustrating successive steps or stages in the operation of the system for scavenging purposes.

Referring first to FIG. 1, a main length of pipe 1, of essentially smooth bore and constant diameter, has a side connection 2 near its inlet or upstream end, to permit entry of fluid into the main pipe, and a side connection 3 near its outlet or downstream end, to permit egress of the fluid from the main pipe. The main pipe 1 is intended to serve as a transfer line, and is intended to carry alternatively any one of a plurality of different fluids, such as different types of lubricating oils. For example, pipe 1 may transfer any one of a plurality of different valuable products from a suitable storage container to a tank car, tank truck, or other bulk shipment container. This is illustrated in FIG. 1 by means of the legend "From Storage" on side connection 2, and "To Bulk Shipment Container" on side connection 3. Side connection 2 has a valve 4 therein closely adjacent the main pipe 1, and side connection 3 has a valve 5 therein closely adjacent the main pipe; it may therefore be stated that the side connections 2 and 3 are close coupled.

The side connection 2 is near to but spaced from the inlet end of the pipe 1. The space between this side connection and the inlet end of the main pipe 1 provides a socket 6. Socket 6 is designed to provide a receptacle for a free imperforate piston or "pig" 7 (illustrated as a ball), this piston 7 being normally disposed in socket 6, when such piston is at rest. The socket 6 has such dimensions that, when piston 7 is disposed therein, this piston is entirely on the upstream side of side connection 2, that is, the piston 7 is entirely positioned between the side connection 2 and the inlet end of pipe 1, so that the piston does not impede the flow of fluid or the passage of fluid down side connection 2 and into main line 1.

The piston 7 is constructed and arranged to fit tightly in the bore of the main pipe 1 as a cylinder, and this piston may actually comprise a cylindrical body having flanged portions at its ends for tight engagement with the internal wall of pipe 1. It is shown as a ball in the drawings merely for ease of illustration.

The side connection 3 is near to but spaced from the outlet end of pipe 1. The space between this side connection and the outlet end of the main pipe 1 provides a socket 8. Socket 8 is designed to provide a receptacle for a free imperforate piston or "pig" 9 (illustrated as a ball), this piston 9 being normally disposed in socket 8, when such piston is at rest. The socket 8 has such dimensions that, when piston 9 is disposed therein, this piston is entirely on the downstream side of side connection 3, that is, the piston 9 is entirely positioned between the side connection 3 and the outlet end of pipe 1, so that the piston does not impede the flow of fluid or the passage of fluid from main pipe line 1 out into side connection 3.

The piston 9 is constructed and arranged to fit tightly in the bore of the main pipe 1 as a cylinder, and this piston may actually comprise a cylindrical body having flanged portions at its ends for tight engagement with the internal wall of pipe 1. It is shown as a ball in the drawings merely for ease of illustration.

The side connections 2 and 3 must be smaller in diameter than the main pipe 1, so that when pistons 7 and 9 are caused to move in main pipe 1 (as described hereinafter), they will not enter the side connections. Alternatively, the side connections 2 and 3 may be coupled to the main pipe 1 by means of a plurality of small apertures in this pipe, of a size to permit the free flow of fluid but to prevent passage therethrough of the pistons.

Socket 6 is provided with a hydraulic connection at its outer (or closed) end, to which is attached a hydraulic conduit 10, the opposite end of this conduit being coupled to one coupling of a four-way valve 11. Socket 8 is provided with a hydraulic connection at its outer (or closed) end, to which is attached a hydraulic conduit 12, the opposite end of this latter conduit being coupled to a second coupling of the valve 11. A conduit 13 leads from a third coupling of valve 11 to the inlet end of a hydraulic fluid reservoir or dump 14. A hydraulic fluid pump 15 takes hydraulic fluid B from reservoir 14 by means of a conduit 16, and pumps such fluid under pressure through a conduit 17 to the fourth coupling of valve 11. The pump 15 is driven by an electric motor 18, the electric power to which is controlled by means of a switch 19. Thus, the pump 15 may be stopped and started at will, by suitable operation of switch 19.

Figure 5:
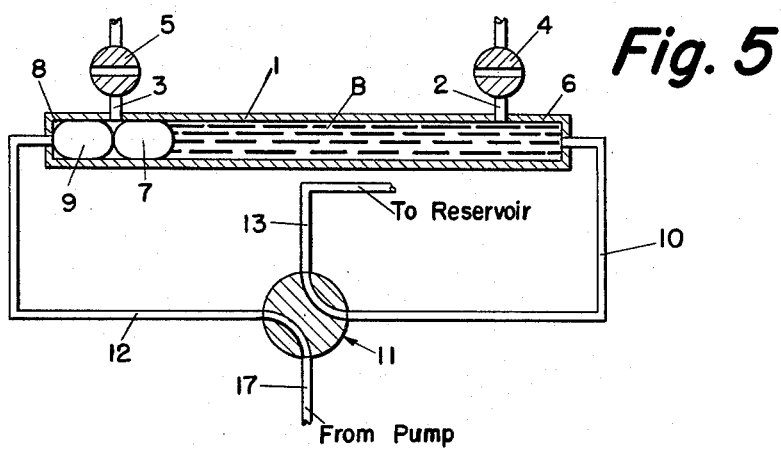

The valve 11 is capable of operation selectively to either one of two positions, one of which is illustrated in FIG. 1 and the other in FIG. 5. In the FIG. 1 position, conduits 12 and 13 are coupled together through the valve, and conduits 10 and 17 are coupled together through the valve. In the FIG. 5 position, conduits 12 and 17 are coupled together through the valve, and conduits 10 and 13 are also coupled together through the valve.

FIG. 1 shows Product I (denoted by reference character A) being transferred from storage by way of open valve 4 and side connection 2 to the upstream end of line 1, and from the downstream end of line 1 through side connection 3 and open valve 5 to the bulk shipment container. The pistons 7 and 9 are in their respective sockets 6 and 8, and do not interfere with this fluid flow. The pump 15 is not running and no hydraulic fluid is flowing.

Figure 2:
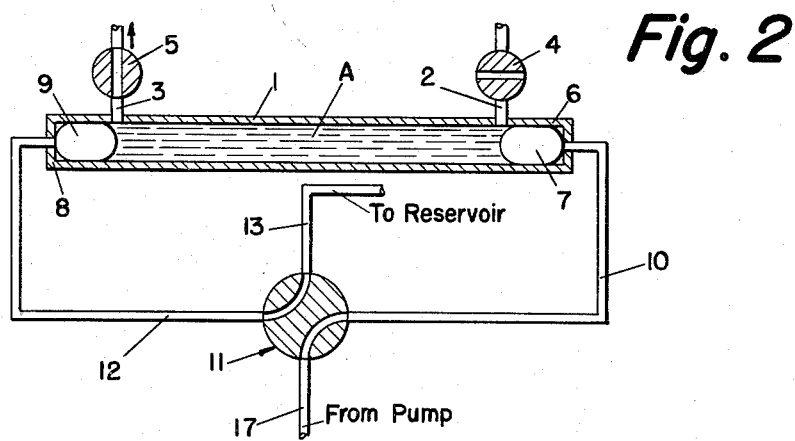

FIG. 2 illustrates the situation existing when the batch storage tank containing Product I is emptied and the inlet valve 4 is closed. For purposes of simplification, the reservoir or dump 14, the pump 15, the conduit 16, the motor 18, and the switch 19 have been omitted from FIGS. 2-10. The pistons 7 and 9 are still in their respective sockets, and no hydraulic fluid is flowing.

Figure 3:
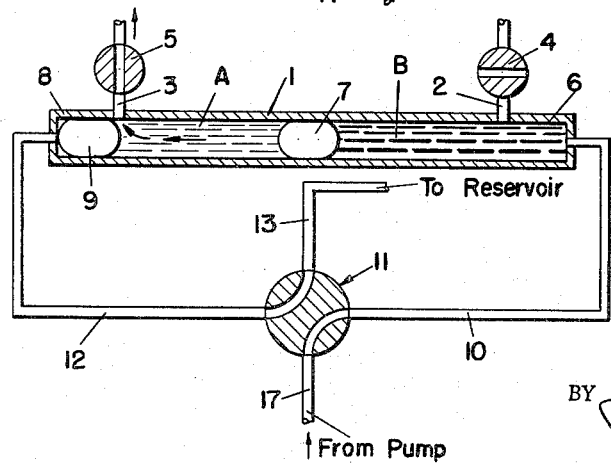

The hydraulic pump 15 is now started by closing switch 19 to energize motor 18. Hydraulic fluid B is then forced under pressure through conduit 17, valve 11, and conduit 10 into the closed end of socket 6, moving the right-hand piston 7 to the left or in the downstream direction along main pipe 1. By way of example, the hydraulic fluid utilized may be any suitable neutral oil. The above-described movement of piston 7 forces the product remaining in line 1 ahead (downstream) of piston 7 into the bulk shipment container by way of side connection 3 and open valve 5, at the same time cleaning the inside wall of line 1 by "squeegee" action. This results in the complete and thorough scavenging of Product I from the line. FIG. 3 illustrates a point in the movement of piston 7 to the left or downstream, when this piston has travelled approximately halfway along the length of main pipe 1.

Figure 4:
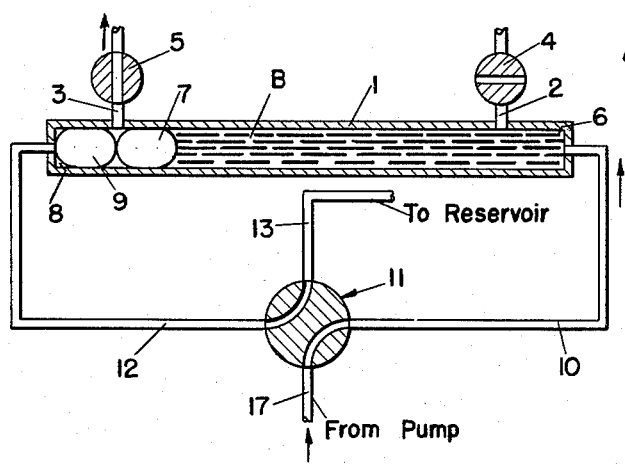

FIG. 4 illustrates the situation at the end of the scavenging or positive transfer action. Piston 7 has reached the end of its downstream travel and is in contact with piston 9. Product I has been substantially completely displaced from the line, and the line is now filled with hydraulic oil, behind or on the upstream side of piston 7. A substantially completely transfer of the measured quantity (batch) of Product I to the bulk shipment container has now been effected, with no appreciable loss of product. Thus, one of the principal advantages of the system of this invention is that it permits the preparation of a measured quantity of a product required for a given shipment, and the substantially complete transfer of this measured quantity to a bulk shipment container. In this connection, it is desired to be pointed out that the valves 4 and 5 are close-coupled to the line 1, to minimize the retention of product or of hydraulic oil between the valves and the line.

Since in FIG. 4 the line 1 is substantially completely filled with a neutral hydraulic oil, it is in a relatively clean condition.

When the FIG. 4 condition is reached, that is, when piston 7 contacts piston 9 at the downstream end of pipe 1, the hydraulic pump 15 is stopped or turned off. Then, the product outlet valve 5 is closed, and the hydraulic oil control valve 11 is reversed, as illustrated in FIG. 5. When the hydraulic pump is again started, hydraulic fluid is forced under pressure through conduit 17, valve 11, and conduit 12 into the closed end of socket 8, moving pistons 9 and 7 as a unit (since these two pistons are now in engagement, and since the hydraulic fluid pressure acts on piston 9) toward the right or upstream. In fact, it can be said that the left-hand piston 9 moves the right-hand piston 7 in the upstream direction. The hydraulic oil on the upstream (right) side of piston 7 is now swept, as piston 7 moves to the right, through conduit 10, valve 11, and conduit 13, back to the reservoir or dump 14.

Figure 6:
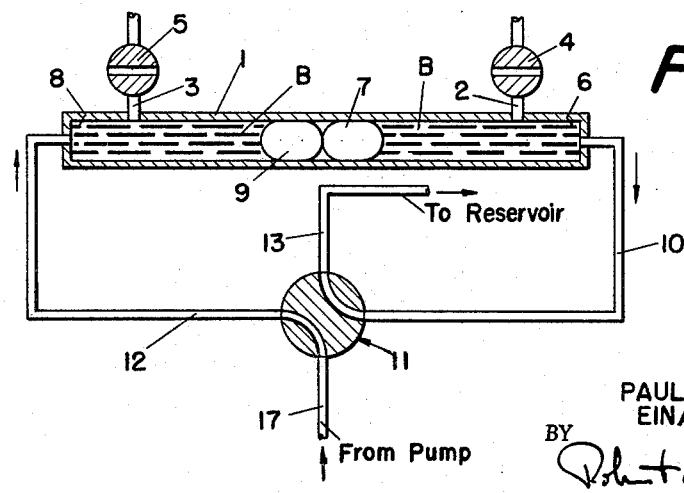

FIG. 6 shows the two pistons 9 and 7 being moved as a unit by the hydraulic oil pumped to the downstream socket 8, sweeping the hydraulic oil already in line 1 back to the hydraulic reservoir or dump 14.

Figure 7:
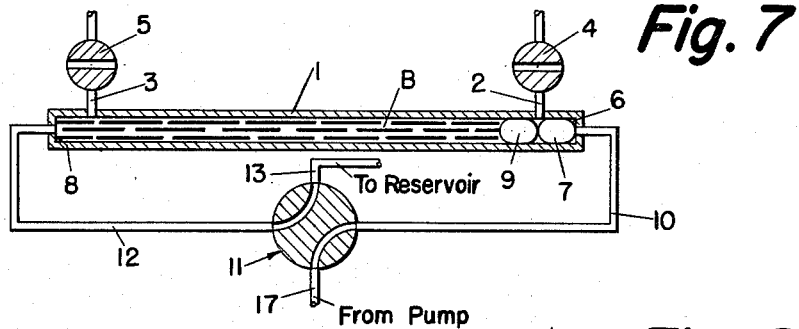

The "pigs" or pistons 9 and 7 are thus both moved to the upstream end of line 1. When they have reached the upstream end, as shown in FIG. 7, the hydraulic pump is stopped and the hydraulic control valve 11 is returned to its original (or FIG. 1) position, as also illustrated in FIG. 7.

Figure 8:
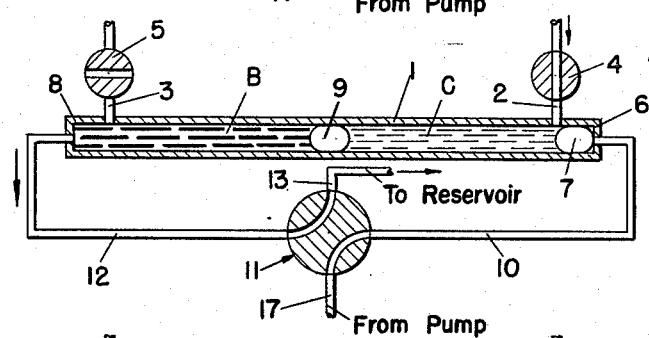

The line 1 is now completely scavenged, is filled with neutral (hydraulic) oil, and piston 7 is now back in its original or FIG. 1 position, in socket 6. The line is thus in a relatively clean condition, and is now ready for the transfer of a different product, Product II (denoted by reference character C), without further cleaning. In order to start the delivery of Product II, inlet valve 4 is opened, as shown in FIG. 8, and this second product is fed into inlet side connection 2. FIG. 8 illustrates the situation just after the start of the delivery of Product II. Now, Product II displaces the hydraulic oil in the main line 1. Product II separates the two pistons 7 and 9, moving only the left-hand piston 9 ahead of it (since right-hand piston 7 is now in its socket or receptacle 6, wherein it does not impede or interfere with the passage of fluid or fluid flow through side connection 2 and into main pipe 1), and displacing the hydraulic oil on the left-hand or downstream side of piston 9 through conduit 12, valve 11, and conduit 13 to the hydraulic reservoir or dump 14. It may thus be seen that only one of the free pistons is moved by the product being transferred through line 1.

Figure 9:
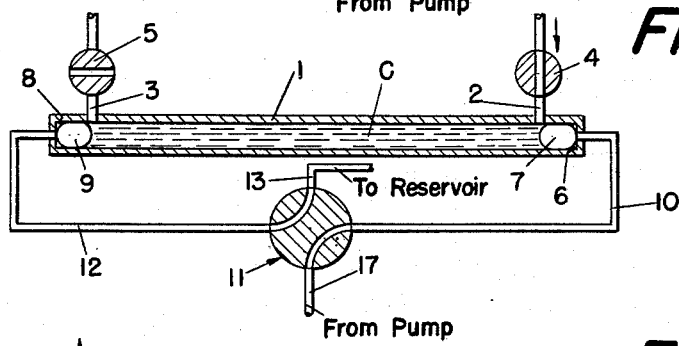

The above action now continues until the piston or "pig" 9 reaches its retaining socket or receptacle 8, at the downstream end of pipe 1, as illustrated in FIG. 9. As illustrated in this latter figure, both of the pistons 7 and 9 are now in their original (or FIG. 1) positions, the hydraulic oil is out of the line 1, and this main pipe is now full of the second product, Product II, ready for delivery to the bulk shipping container.

Figure 10:
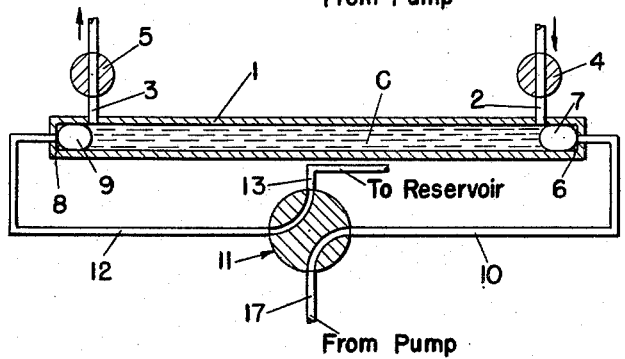

When the FIG. 9 situation is reached, the outlet valve 5 is opened, as illustrated in FIG. 10, so that the new product, Product II, runs through the main pipe and both side connections 2 and 3. FIG. 10 is quite similar to FIG. 1, with both side connections open and product being delivered through the line, except that now Product II is being delivered through the line.

Although there is no theoretical limitation on the length of the product or transfer line 1, there are practical limitations (e.g., the time required to move pistons through the entire length of line, the amount of hydraulic oil required, etc.) which make the system of this invention particularly advantageous for intra-plant transfers, where such lines are usually less than about 1000 feet in total length. It should also be pointed out that the transfer line 1 must have a substantially smooth bore and constant diameter, with no sharp turns or elbows, since (as shown in FIG. 6) both pistons must move as a unit during one step of the operation. Also, the design of the pistons themselves is rather important, in order to obtain smooth operation around bends of wide radius and an efficient cleaning action on the inside surface of the pipe.

The system described lends itself well to remote control, for example from a central point. The valves 4, 5, and 11 can be easily set up for remote operation, as can the control of the hydraulic pump.

Several other scavenging schemes are possible, although it is true that these other schemes do not function to clean the pipe quite as well as the moving-piston scheme previously described. The pipe 1 may have secured therein an air-tight plastic liner which can be expanded by means of compressed air supplied thereto, to fill the inside of the pipe and thus "squeeze" the product remaining in the pipe down to the outlet connection 3. Or, a collapsible (flexible) bag may be positioned inside pipe 1, this bag being expanded by means of compressed air supplied thereto, to fill the inside of the pipe and "squeeze" the product remaining in the pipe down to the outlet connection 3.

We claim:

1. In a system for transferring predetermined quantities of fluids, a main length of pipe having a respective side connection near each of its two ends but spaced therefrom, said side connections serving to respectively permit entry of fluid into the main pipe and egress of the fluid therefrom, a valve in each of said side connections closely adjacent said main pipe, the space between the entry side connection and its adjacent end providing a socket; a free imperforate piston normally disposed in said socket in such a position as not to impede fluid flow through the entry side connection, said piston being constructed and arranged to fit tightly in the bore of said main pipe as a cylinder, a hydraulic connection to the closed end of said socket, and means for coupling said hydraulic connection selectively and at will to a hydraulic fluid pump or to a hydraulic fluid dump.

2. In a system for transferring predetermined quantities of fluids, a main length of pipe having a respective side connection near each of its two ends but spaced therefrom, said side connections serving to respectively permit entry of fluid into the main pipe and egress of the fluid therefrom, the space between the entry side connection and its adjacent end providing a socket; a free imperforate piston normally disposed in said socket in such a position as not to impede fluid flow through the entry side connection, said piston being constructed and arranged to fit tightly in the bore of said main pipe as a cylinder, a hydraulic connection to the closed end of said socket, and means for coupling said hydraulic connection selectively and at will to a hydraulic fluid pump or to a hydraulic fluid dump, the hydraulic fluid in said dump being different from the fluids normally flowing through said pipe.

3. In a system for transferring predetermined quantities of fluids, a main length of pipe having a respective side connection near each of its two ends but spaced therefrom, said side connections serving to respectively permit entry of fluid into the main pipe and egress of the fluid therefrom, the space between each side connection and its respective adjacent end providing a socket; a free imperforate piston normally disposed in each of said sockets in such a position as not to impede fluid flow through the side connections, each of said pistons being constructed and arranged to fit tightly in the bore of said main pipe as a cylinder, a separate hydraulic connection to the closed end of each of said sockets, and means for coupling each of said hydraulic connections selectively and at will to a hydraulic fluid pump or to a hydraulic fluid dump.

4. In a system for transferring predetermined quantities of fluids, a main length of pipe having a respective side connection near each of its two ends but spaced therefrom, said side connections serving to respectively permit entry of fluid into the main pipe and egress of the fluid therefrom, a valve in each of said side connections closely adjacent said main pipe, the space between each side connection and its respective adjacent end providing a socket; a free imperforate piston normally disposed in each of said sockets in such a position as not to impede fluid flow through the side connections, each of said pistons being constructed and arranged to fit tightly in the bore of said main pipe as a cylinder, a separate hydraulic connection to the closed end of each of said sockets, and means for coupling each of said hydraulic connections selectively and at will to a hydraulic fluid pump or to a hydraulic fluid dump, the hydraulic fluid in said dump being different from the fluids normally flowing through said pipe.

5. An arrangement for scavenging a length of pipe which is adapted to carry alternatively any one of a plurality of different fluids, comprising a first free imperforate piston constructed and arranged to fit tightly in the bore of said pipe as a cylinder, a first side connection serving to permit entry of fluid into said pipe, said connection being so located that it is unobstructed by said first piston when the latter is in its original position; means for applying a hydraulic fluid, different from the fluids normally carried by said pipe, under pressure to one side of said piston, to thereby force said piston in one direction through the entire length of said pipe, a second free imperforate piston constructed and arranged to fit tightly in the bore of said pipe as a cylinder, a portion of said second piston engaging said first piston when the latter has completed its travel in said one direction, a second side connection serving to permit egress of fluid from said pipe, said second connection being so located that it is unobstructed by said second piston when the latter is in its original position; and means for applying a hydraulic fluid, different from the fluids normally carried by said pipe, under pressure to an opposite portion of said second piston so as to move it, and thereby also said first piston, in a direction opposite to said one direction through the entire length of said pipe.

6. An arrangement for scavenging a length of pipe which is adapted to carry alternatively any one of a plurality of different fluids, comprising a first free imperforate piston constructed and arranged to fit tightly in the bore of said pipe as a cylinder, said piston originally being located at the upstream end of said pipe, a first side connection, near the upstream end of said pipe, serving to permit entry of fluid into said pipe, said connection being so located that it is unobstructed by said first piston when the latter is in its original location; means for applying a hydraulic fluid, different from the fluids normally carried by said pipe, under pressure to one side of said piston, to thereby force said piston in the downstream direction through the entire length of said pipe, a second free imperforate piston constructed and arranged to fit tightly in the bore of said pipe as a cylinder, said second piston originally being located at the downstream end of said pipe, a portion of said second piston engaging said first piston when the latter has completed its travel in the downstream direction, a second side connection, near the downstream end of said pipe, serving to permit egress of fluid from said pipe, said second connection being so located that it is unobstructed by said second piston when the latter is in its original location; and means for applying a hydraulic fluid, different from the fluids normally carried by said pipe, under pressure to an opposite portion of said second piston so as to move it, and thereby also said first piston, in the upstream direction through the entire length of said pipe.

References Cited in the file of this patent

UNITED STATES PATENTS

| | | |
|---|---|---|
| 1,624,786 | Gerber | Apr. 12, 1927 |
| 2,055,287 | Giraud | Sept. 22, 1936 |
| 2,177,429 | Foster | Oct. 24, 1939 |
| 2,705,419 | Chawner | Apr. 5, 1955 |
| 2,796,878 | Atkinson | June 25, 1957 |
| 2,874,078 | Reinhart | Feb. 17, 1959 |